United States Patent
Juestel et al.

(10) Patent No.: US 7,372,196 B2
(45) Date of Patent: May 13, 2008

(54) PLASMA DISPLAY SCREEN COMPRISING A GREEN PHOSPHOR

(75) Inventors: Thomas Juestel, Aachen (DE); Walter Mayr, Alsdorf (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 348 days.

(21) Appl. No.: 10/496,550

(22) PCT Filed: Nov. 28, 2002

(86) PCT No.: PCT/IB02/05029

§ 371 (c)(1),
(2), (4) Date: May 25, 2004

(87) PCT Pub. No.: WO03/046935

PCT Pub. Date: Jun. 5, 2003

(65) Prior Publication Data

US 2005/0017626 A1    Jan. 27, 2005

(30) Foreign Application Priority Data

Nov. 28, 2001 (DE) ............... 101 58 273

(51) Int. Cl.
*H01J 1/62* (2006.01)
*C09K 11/08* (2006.01)

(52) U.S. Cl. .................. 313/486; 252/301.4 R

(58) Field of Classification Search ......... 252/301.4 R; 313/486
See application file for complete search history.

(56) References Cited

U.S. PATENT DOCUMENTS 4,512,912 A * 4/1985 Matsuda et al. ...... 252/301.6 S
6,462,473 B1 * 10/2002 Juestel et al. ............ 313/586

OTHER PUBLICATIONS

Shionoya, S.; Yen, W. M.; "Phosphor Handbook", CRC Press LLC, 1999, pp. 177-200.*

* cited by examiner

Primary Examiner—Nimeshkumar D. Patel
Assistant Examiner—Anne M Hines

(57) ABSTRACT

The invention relates to a plasma display screen comprising a carrier plate, a transparent front plate, a ribbed structure which divides the space between the carrier plate and the front plate into plasma cells that are filled with a gas, one or more electrode arrays to generate corona discharges in the plasma cells, and a phosphor layer which comprises a phosphor selected from the group composed of doped terbium(III)-activated phosphors of the general formula $(In_{1-x-y-z}Gd_yY_z)BO_3:Tb_x$, where $0<x\leq0.5$ and $0<y\leq0.5$, $0\leq z\leq0.5$ and $1-x-y-z>0$. The invention also relates to a phosphor selected from the group composed of doped terbium(III)-activated phosphors of the general formula $(In_{1-x-y-z}Gd_yY_z)BO_3:Tb_x$, where $0<x\leq0.5$ and $0<y\leq0.5$, $0\leq z\leq0.5$ and $1-x-y-z>0$.

12 Claims, 1 Drawing Sheet

PLASMA DISPLAY SCREEN COMPRISING A GREEN PHOSPHOR

Figure 1:
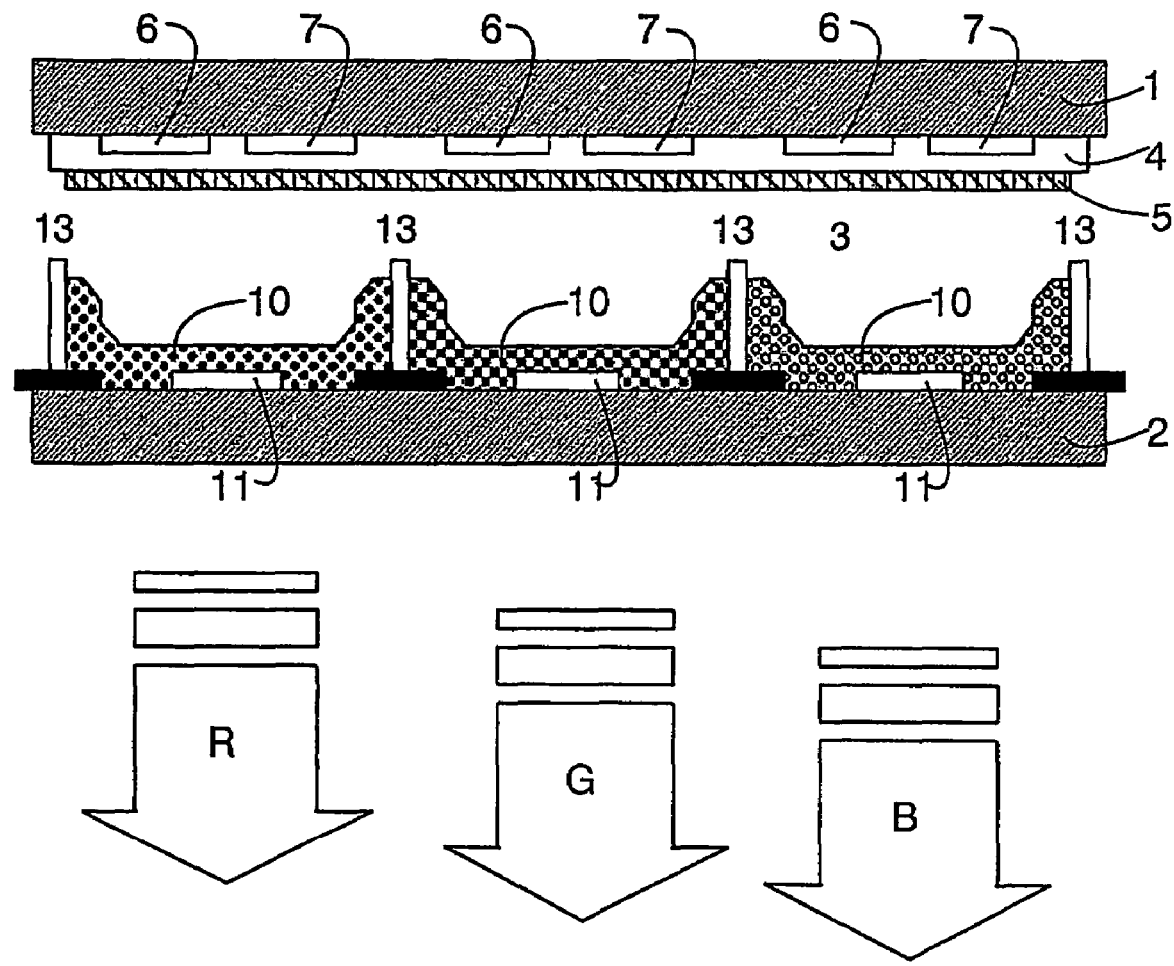

The invention relates to a plasma display screen comprising a carrier plate, a transparent front plate, a ribbed structure which divides the space between the carrier plate and the front plate into plasma cells which are filled with a gas, one or more electrode arrays to generate corona discharges in the plasma cells, and a phosphor layer comprising a green-emitting phosphor of the group composed of doped terbium-activated borate-containing phosphors.

The principle on which a plasma display screen is based is that a high voltage in a gas with a low gas pressure causes electromagnetic radiation to be generated, which radiation may be visible itself or can be converted into visible light by phosphors.

In a color display screen of customary design, the gas filling is composed of an inert gas, for example xenon, or an inert gas mixture such as a mixture of helium, neon and xenon. The discharge process involves the generation of ultraviolet radiation in the VUV range, i.e. radiation having a wavelength below 200 nm. This VUV radiation excites the red, green and blue-emitting phosphors (RGB phosphors) in the phosphor layer, thereby causing them to emit visible light in the colors red, green and blue. Thus, unlike conventional fluorescent lamps, the luminescent materials in plasma display screens use the high energy side of the UV spectrum. Dependent upon the composition of the inert gas mixture and the gas pressure, the VUV emission can vary between a single line at 147 nm and a broad band in the region of 172 nm. What results from this is that new demands are imposed on the RGB phosphors in a plasma display screen.

The RGB phosphors constitute the final member of the energy-transfer chain wherein electric energy is converted into visible light in the plasma display screen. A factor that has a decisive influence on the efficiency of a plasma display screen with a phosphor layer is the electro-optical efficiency of the phosphors, i.e. how completely the UV light generated is absorbed in the phosphor and how completely the visible light generated subsequently leaves the plasma display screen in the direction of the viewer. The phosphors for red, green and blue, however, have different properties in terms of long-term behavior, but also their color saturation and perceptibility are different.

CN 1276406 discloses a green phosphor for plasma display screens of the chemical formula $(Ln_{1-x-y-z})Tb_xR_yLi_z)$ [$(1-M)PO_4$ $mBO_3$], which phosphor comprises at least a rare earth metal Yb, La, Gd and Lu, phosphates of Li and B, a main activator (Tb ions) and a co-activator (Ce, Pr and Dy ions), and which phosphor is manufactured by calcination at a high temperature. If said green phosphor is excited by VUV light, short-wave UV light, electron rays and X-rays, it emits strong green light with an emission maximum at 544 nm.

A drawback of these phosphors for generating said green color radiation resides in that their color point and color saturation are not optimal for plasma display screens.

It is an object of the invention to provide a plasma display screen comprising a carrier plate, a transparent front plate, a ribbed structure dividing the space between the carrier plate and the front plate into plasma cells which are filled with a gas, one or more electrode arrays for generating corona discharges in the plasma cells, and a phosphor layer comprising a green-emitting phosphor of the group composed of doped terbium-activated phosphors, which plasma display screen is characterized by an improved, faithful color rendition and a higher brightness.

In accordance with the invention, this object is achieved by a plasma display screen comprising a carrier plate, a transparent front plate, a ribbed structure dividing the space between the carrier plate and the front plate into plasma cells which are filled with a gas, one or more electrode arrays for generating corona discharges in the plasma cells, and a phosphor layer comprising a phosphor selected from the group composed of doped terbium(III)-activated phosphors of the general formula $(In_{1-x-y-z}Gd_yY_z)BO_3:Tb_x$, where $0<x\leq 0.5$ and $0<y\leq 0.5$, $0\leq z\leq 0.5$ and $1-x-y-z>0$.

In such a color display screen, the green point has been shifted to attain a higher color saturation. This has an influence not only on the green tones but also on all intermediate tones on the blue-green and red-green lines which become available as a result of the enlargement of the display triangle in the green range. By virtue thereof, a more faithful display of many color tones is possible, resulting in a visible difference. In addition, the color contrast under bright ambient light conditions is increased.

The invention also relates to a phosphor selected from the group of doped terbium(III)-activated phosphors of the general formula $(In_{1-x-y-z}Gd_yY_z)BO_3:Tb_x$, where $0<x\leq 0.5$ and $0<y\leq 0.5$, $0\leq z\leq 0.5$ and $1-x-y-z>0$.

This phosphor is characterized by improved thermal loadability, particularly in an oxygen-containing atmosphere, which can be attributed to the fact that Tb(III) does not have a tendency to oxidize to Tb(IV). As a result, the luminance of this phosphor is not adversely affected during the manufacture of the plasma display screen, and the efficiency remains constant for a very long time even in the case of excitation by VUV radiation.

These and other aspects of the invention are apparent from and will be elucidated with reference to a drawing and two examples.

In the drawing:

FIG. 1 shows a plasma color display screen of the surface discharge-type which is composed of a system of layers which are arranged above one another and partly next to each other.

In a plasma display screen of the surface discharge type, light is generated in a plasma by a gas discharge in a three-electrode system. Said three-electrode system comprises an address electrode and two discharge electrodes per pixel, between which an alternating voltage is applied during operation.

Such a plasma color display screen of the surface discharge type is composed of a transparent front plate 1 and a carrier plate 2, which are arranged at a distance from each other and are hermetically sealed at the periphery. The space between the two plates constitutes the discharge space 3 which is bounded by the protective layer and the phosphor layer. Customarily, the front plate as well as the carrier plate are made of glass. Individually drivable plasma cells are formed by a ribbed structure 13 having separating ribs. A plurality of transparent picture electrodes 6, 7 are arranged in the form of stripes on the front plate. The associated control electrodes 11 are provided at right angles thereto on the carrier plate, so that a discharge can be ignited at each one of the crossing points.

The discharge space is filled with an appropriate discharge gas, for example xenon, a xenon-containing gas, neon or a neon-containing gas. The gas discharge is ignited between the picture electrodes 6, 7 on the front plate. To preclude direct contact between the plasma and the picture electrodes 6, 7, the latter are covered with a dielectric layer 4 and a protective layer 5. In the discharge space, the gas is ionized and a plasma develops which emits VUV radiation.

Dependent upon the composition of the gas in the plasma cell, the spectral intensity of the gas discharge changes. Gas mixtures containing less than 30% by volume xenon emit substantially resonant radiation at 147 nm, gas mixtures containing more than 30% by volume xenon emit excimer radiation at 172 nm.

The emitted VUV radiation excites the structured red, green and blue phosphors pixel by pixel, thereby causing them to emit light in the visible range, as a result of which a color impression is formed. The pixels of the plasma display screen in the three primary colors red, blue and green are formed by a phosphor layer 10 on at least a part of the carrier plate and/or on the walls of the separating ribs in the plasma cells. The plasma cells are each successively coated with a red, green or blue phosphor. Three juxtaposed plasma cells represent one pixel, which enables all colors to be displayed by mixing said three primary colors.

Individually controllable discharge cells are formed by a ribbed structure with separating ribs. A ribbed structure comprising straight, parallel separating ribs divides the discharge space into uninterrupted vertical strips. A ribbed structure with buckled or corrugated separating ribs divides the discharge space into discontinuous chain-type vertically lined up discharge cells of, for example, hexagonal or ellipsoidal cross-section.

Between the separating ribs, the front plate is coated with a phosphor layer of phosphor segments. A picture element, i.e. a pixel, is defined by the combination of at least three sub-pixels in the colors red, green and blue. The sub-pixels are formed by the three luminescent phosphor segments 4G, 4R and 4B in the colors red, green and blue. Three discharge cells each comprising a red, green and blue phosphor segment each form a sub-pixel, and, as a triplet, a picture element.

The pattern of the phosphor segments is determined by the course of the separating ribs and vice versa. In the embodiment shown in FIG. 1, the phosphor segments form an in-line strip pattern, in which the phosphor segments form uninterrupted elongated strips. Along a strip, the color of the phosphor remains unchanged.

In accordance with another embodiment of the invention, the individual phosphor strips may be divided into rectangular phosphor segments (Mondrian pixels) for the three primary colors which are arranged in accordance with a zigzag pattern or a dovetail pattern.

The phosphor segments for the primary colors red, green and blue each comprise a red, green or blue-emitting phosphor. Particular suitable phosphors are phosphors that can be excited by the UV component of the radiation from the gas plasma.

For the red-emitting phosphors that can be excited by VUV radiation use can suitably be made of $(Y,Gd)BO_3:Eu$, $Y_2O_2S:Eu$, $Y_2O_3:Eu$, $Y(VP)O_4:Eu$, $Y(V,P,B)O_4:Eu$, $YVO_4:Eu$, $SrTiO_3:Pr$, $GdMgB_5O_{10}:Ce,Mn$ and $Mg_4GeO_{5.5}F:Mn$.

For the blue-emitting phosphors that can be excited by VUV radiation, use can suitably be made of $(Sr,Mg)_2P_2O_7:Eu$, $Ba,Sr)_5(PO_4)_3Cl:Eu$, $CaWO_4$, $(Y,Gd)(P,V)O_4$ and $Y_2SiO_5:Ce$.

For the green-emitting phosphors that can be excited by UV radiation use is made of doped terbium(III)-activated phosphors of the general formula $(In_{1-x-y-z}Gd_yY_z)BO_3:Tb_x$, where $0<x\leq 0.5$ and $0<y\leq 0.5$, $0\leq z\leq 0.5$ and $1-x-y-z>0$.

For the invention use can particularly suitably be made of a combination of europium-activated barium magnesium aluminate $BaMgAl_{10}O_{17}:Eu$ as the blue-emitting phosphor, europium-activated yttrium oxide $Y_2O_3:Eu$ or europium-activated yttrium gadolinium borate $(Y,Gd)BO_3:Eu$ as the red-emitting phosphor and $(In_{0.45}Gd_{0.45})BO_3:Tb_{0.1}$, $(In_{0.2}Gd_{0.7})BO_3:Tb_{0.1}$ or $(In_{0.7}Gd_{0.2})BO_3:Tb_{0.1}$ as the green-emitting phosphor.

The doped terbium(III)-activated phosphors for generating the green color radiation having the general formula $(In_{1-x-y-z}Gd_yY_z)BO_3:Tb_x$, where $0<x\leq 0.5$ and $0<y\leq 0.5$, $0\leq z\leq 0.5$ and $1-x-y-z>0$ may have a host lattice having a vaterite structure which is doped with the activator ion $Tb^{3+}$ in a small concentration. The vaterite structure has two crystallographically independent lattice sites which are occupied by the trivalent cations. One lattice site has an inversion center, the other does not. The $Tb^{3+}$ ion occupies both lattice sites.

The doped terbium(III)-activated phosphors for generating the green color radiation having the general formula $(In_{1-x-y-z}Gd_yY_z)BO_3:Tb_x$, where $0<x\leq 0.5$ and $0<y\leq 0.5$, $0\leq z\leq 0.5$ and $1-x-y-z>0$ may alternatively have a host lattice having a calcite structure which is doped with the activator ion $Tb^{3+}$ in a small concentration. The calcite structure has only one crystallographic lattice site, which is occupied by the trivalent cations. This lattice site has an inversion center. The $Tb^{3+}$ ion occupies this lattice site.

In compounds having a vaterite structure or a calcite structure, the activator ion $Tb^{3+}$ has an emission spectrum with three emission lines at 490 nm ($^5D_4$-$^7F_6$), 545 nm ($^5D_4$-$^7F_5$) and 620 nm ($^5D_4$-$^7F_3$). In the case of customary phosphors having terbium ions at lattice sites without inversion symmetry, saturation of this green light emission is reduced by transitions $^5D_4$-$^7F_{6,4,2}$.

By virtue of the fact that the host lattice of the phosphors in accordance with the invention contains the Tb(III)-ions at lattice sites with inversion symmetry or a small deviation from inversion symmetry, the $^5D_4$-$^7F_{6,4,2}$ transitions are suppressed and saturation of the green light emission is increased without the quantum efficiency being reduced.

Consequently, the green emission multiplet at 545 nm is very intensive and exhibits a high lumen equivalent >500 lm/W.

The terbium(III)-activated rare earth metal borates are manufactured by means of conventional methods, for example by means of a solid state reaction. In the manufacturing process, the oxides or carbonates are used as the starting compound. They are mixed, ground and subsequently sintered. As a result, phosphors having a homogeneous crystal structure are obtained in the form of fine-grain particles having a grain size ranging from 1 to 10 μm.

To manufacture the phosphor layer use can be made of dry coating methods, for example electrostatic deposition or electrostatically assisted dusting, as well as wet coating methods, for example screen printing, dispenser methods, wherein a suspension is introduced using a nozzle moving along the channels, or sedimentation from the liquid phase.

For the wet coating methods, the phosphors must be dispersed in water, an organic solvent, if necessary in combination with a dispersing agent, a tenside and an antifoaming agent or a binder preparation. Organic and inorganic binders capable of withstanding an operating temperature of 250° C. without being subject to decomposition, embrittlement or discoloration can suitably be used as the binder preparations for plasma display screens.

Although the invention has been described with reference to a color plasma display screen of the surface discharge type, the application of the invention is not limited to this type of plasma display screen, but also includes, for example, DC color plasma display screens and monochromatic AC and DC plasma display screens.

EXAMPLE 1

To manufacture $(In_{0.7}Gd_{0.2})BO_3:Tb_{0.1}$, a quantity of 10.0 g (36.02 mmol) $In_2O_3$, 3.730 g (10.2 mmol) $Gd_2O_3$, 1.924 g (2.57 mmol) $Tb_4O_7$ and 7.0 g (113.20 mmol) $H_3BO_3$ are thoroughly ground in an agate mortar. After a first tempering operation at 700° C., the powder is ground again and sintered twice at 1100° C. in a CO atmosphere. After the first sintering operation, the powder is ground again. Subsequently, the phosphor is washed with demineralized water, filtered-off and dried at 100° C. As a result, a white powder is obtained which is passed through a sieve with a mesh size of 30 µm. The phosphor thus manufactured was used to manufacture and test a plasma display screen in accordance with the known methods. The measuring values as listed in Table 1 were found.

TABLE 1

| Color location x, y | LO [147 nm] | LO [172 nm] |
|---|---|---|
| 0.338, 0.615 | 0.77 | 0.75 |

The phosphor thus manufactured was used to manufacture and test a plasma display screen in accordance with the known methods.

EXAMPLE 2

To manufacture $(In_{0.2}Gd_{0.7})BO_3:Tb_{0.1}$, a quantity of 2.000 g (7.2 mmol) $In_2O_3$, 10.445 g (28.82 mmol) $Gd_2O_3$, 2.394 g (3.20 mmol) $Tb_4O_7$ and 8.710 g (140.87 mmol) $H_3BO_3$ are thoroughly ground in an agate mortar. After a first tempering operation at 700° C., the powder is ground again and sintered twice at 1100° C. in a CO atmosphere. After the first sintering operation, the powder is ground again. Subsequently, the phosphor is washed with demineralized water, filtered-off and dried at 100° C. As a result, a white powder is obtained which is passed through a sieve having a mesh size of 30 µm. The phosphor thus manufactured was used to manufacture and test a plasma display screen in accordance with the known methods. The measuring values as listed in Table 1 were found.

TABLE 1

| Color location x, y | LO [147 nm] | LO [172 nm] |
|---|---|---|
| 0.338, 0.615 | 0.77 | 0.75 |

The phosphor thus manufactured was used to manufacture and test a plasma display screen in accordance with the known methods.

EXAMPLE 3

To manufacture $(In_{0.45}Gd_{0.45})BO_3:Tb_{0.1}$, a quantity of 8.0 g (28.82 mmol) $In_2O_3$, 10.445 g (28.82 mmol) $Gd_2O_3$, 1.924 g (2.57 mmol) $Tb_4O_7$ and 7.0 g (113.20 mmol) $H_3BO_3$ are thoroughly ground in an agate mortar. After a first tempering operation at 700° C., the powder is ground again and sintered twice at 1100° C. in a CO atmosphere. After the first sintering operation, the powder is ground again. Subsequently, the phosphor is washed with demineralized water, filtered-off and dried at 100° C. As a result, a white powder is obtained which is passed through a sieve having a mesh size of 30 µm. The phosphor thus manufactured was used to manufacture and test a plasma display screen in accordance with the known methods. The measuring values as listed in Table 1 were found.

TABLE 1

| Color location x, y | LO [147 nm] | LO [172 nm] |
|---|---|---|
| 0.338, 0.615 | 0.77 | 0.75 |

The phosphor thus manufactured was used to manufacture and test a plasma display screen in accordance with the known methods.

The invention claimed is:

1. A plasma display screen comprising a carrier plate, a transparent front plate, a ribbed structure which divides the space between the carrier plate and the front plate into plasma cells which are filled with a gas, one or more electrode arrays for generating corona discharges in the plasma cells, and a phosphor layer comprising a phosphor selected from the group composed of doped terbium(III)-activated phosphors of the general formula $(In_{1-x-y-z}Gd_yY_z)BO_3:Tb_x$ where $0<x\leq0.5$, $0<y\leq0.5$, $0\leq z\leq0.5$ and 1-x-y-z>0, wherein the phosphor comprises a vaterite structure host lattice with two crystallographically independent lattice sites which are doped with the terbium(III) activator, wherein one lattice site has an inversion center and another lattice site does not have the inversion center, and wherein the terbium(III) activator occupies the two lattice sites.

2. A phosphor selected from the group composed of doped terbium(III)-activated phosphors of the general formula $(In_{1-x-y-z}Gd_yY_z)BO_3:Tb_x$ where $0<x\leq0.5$, $0<y\leq0.5$, $0\leq z\leq0.5$ and 1-x-y-z>0, wherein the phosphor comprises a vaterite structure host lattice with two crystallographically independent lattice sites which are doped with the terbium (III) activator, wherein one lattice site has an inversion center and another lattice site does not have the inversion center, and wherein the terbium(III) activator occupies the two lattice sites.

3. The phosphor as claimed in claim 1, wherein the phosphor is a green-emitting phosphor.

4. A plasma display screen comprising a carrier plate, a transparent front plate, a ribbed structure which divides the space between the carrier plate and the front plate into plasma cells which are filled with a gas, one or more electrode arrays for generating corona discharges in the plasma cells, and a phosphor layer comprising a phosphor selected from the group composed of doped terbium(III)-activated phosphors of the general formula $(In_{1-x-y-z}Gd_yY_z)BO_3:Tb_x$ where $0<x\leq0.5$, $0<y\leq0.5$, $0\leq z\leq0.5$ and 1-x-y-z>0, wherein the phosphor comprises a vaterite structure host lattice with two crystallographically independent lattice sites which are doped with the terbium(III) activator, wherein one lattice site has an inversion center, and wherein the terbium(III) activator occupies the two lattice sites.

5. The phosphor as claimed in claim 1, wherein the phosphor comprises a calcite structure host lattice with one crystallographically independent lattice site which is doped with the terbium(III) activator, and wherein the terbium(III) activator occupies the lattice site.

6. A plasma display screen comprising a carrier plate, a transparent front plate, a ribbed structure which divides the space between the carrier plate and the front plate into plasma cells which are filled with a gas, one or more electrode arrays for generating corona discharges in the plasma cells, and a phosphor layer comprising a phosphor selected from the group composed of doped terbium(III)-activated phosphors of the general formula $(In_{1-x-y-z}Gd_yY_z)BO_3:Tb_x$ where $0<x\leq0.5$, $0<y\leq0.5$, $0\leq z\leq0.5$ and $1-x-y-z>0$, wherein the phosphor has a green emission multiplet at 545 nm that exhibits a lumen equivalent greater than 500 lm/W.

7. A plasma display screen comprising a carrier plate, a transparent front plate, a ribbed structure which divides the space between the carrier plate and the front plate into plasma cells which are filled with a gas, one or more electrode arrays for generating corona discharges in the plasma cells, and a phosphor layer comprising a phosphor selected from the group composed of doped terbium(III)-activated phosphors of the general formula $(In_{1-x-y-z}Gd_yY_z)BO_3:Tb_x$ where $0<x\leq0.5$, $0<y\leq0.5$, $0\leq z\leq0.5$ and $1-x-y-z>0$, wherein the phosphor includes at least one of $(In_{0.45}Gd_{0.45})BO_3:Tb_{0.1}$, $(In_{0.2}Gd_{0.7})BO_3:Tb_{0.1}$ and $(In_{0.7}Gd_{0.2})BO_3:Tb_{0.1}$.

8. The phosphor as claimed in claim 2, wherein the phosphor is a green-emitting phosphor.

9. A phosphor selected from the group composed of doped terbium(III)-activated phosphors of the general formula $(In_{1-x-y-z}Gd_yY_z)BO_3:Tb_x$ where $0<x\leq0.5$, $0<y\leq0.5$, $0\leq z\leq0.5$ and $1-x-y-z>0$, wherein the phosphor comprises a vaterite structure host lattice with two crystallographically independent lattice sites which are doped with the terbium (III) activator, wherein one lattice site has an inversion center, and wherein the terbium(III) activator occupies the two lattice sites.

10. The phosphor as claimed in claim 2, wherein the phosphor comprises a calcite structure host lattice with one crystallographically independent lattice site which is doped with the terbium(III) activator, and wherein the terbium(III) activator occupies the lattice site.

11. A phosphor selected from the group composed of doped terbium(III)-activated phosphors of the general formula $(In_{1-x-y-z}Gd_yY_z)BO_3:Tb_x$ where $0<x\leq0.5$, $0<y\leq0.5$, $0\leq z\leq0.5$ and $1-x-y-z>0$, wherein the phosphor has a green emission multiplet at 545 nm that exhibits a lumen greater than 500 lm/W.

12. A phosphor selected from the group composed of doped terbium(III)-activated phosphors of the general formula $(In_{1-x-y-z}Gd_yY_z)BO_3:Tb_x$ where $0<x\leq0.5$, $0<y\leq0.5$, $0\leq z\leq0.5$ and $1-x-y-z>0$, wherein the phosphor includes at least one of $(In_{0.45}Gd_{0.45})BO_3:Tb_{0.1}$, $(In_{0.2}Gd_{0.7})BO_3:Tb_{0.1}$ and $(In_{0.7}Gd_{0.2})BO_3:Tb_{0.1}$.

* * * * *